United States Patent [19]
Schleicher et al.

[11] Patent Number: 5,837,036
[45] Date of Patent: Nov. 17, 1998

[54] PROCESS AND FILTER FOR REMOVING ORGANIC SUBSTANCES AND OZONE FROM GASES

[75] Inventors: Andreas Schleicher, Beselich; Jörg Von Eysmondt, Hofheim; Georg Frank, Tübingen, all of Germany

[73] Assignee: Ticona GmbH, Germany

[21] Appl. No.: 776,825

[22] PCT Filed: Jul. 6, 1995

[86] PCT No.: PCT/EP95/02624

§ 371 Date: Apr. 7, 1997

§ 102(e) Date: Apr. 7, 1997

[87] PCT Pub. No.: WO96/03201

PCT Pub. Date: Feb. 8, 1996

[30] Foreign Application Priority Data

Jul. 21, 1994 [DE] Germany ................ 44 25 913.1

[51] Int. Cl.⁶ .................................. B01D 53/04
[52] U.S. Cl. ................... 95/138; 95/144; 95/146; 96/132; 96/135
[58] Field of Search .............. 95/138, 141, 143–147; 96/108, 132, 133; 423/219, 245.1

[56] References Cited

U.S. PATENT DOCUMENTS

| | | | |
|---|---|---|---|
| 1,382,889 | 6/1921 | Burrell et al. | 95/141 X |
| 3,844,739 | 10/1974 | Alfrey, Jr. | 95/146 |
| 3,933,431 | 1/1976 | Trujillo et al. | 95/141 X |
| 4,259,299 | 3/1981 | Hagiwara et al. | 423/219 |
| 4,421,533 | 12/1983 | Nishino et al. | 95/138 |
| 4,762,536 | 8/1988 | Purtschert | 95/143 |
| 5,217,505 | 6/1993 | Maroldo et al. | 95/141 |
| 5,256,377 | 10/1993 | Nakamaru et al. | 96/133 X |
| 5,262,129 | 11/1993 | Terada et al. | 423/219 X |
| 5,288,307 | 2/1994 | Goltz et al. | 95/143 |
| 5,423,902 | 6/1995 | Strutz et al. | 95/138 X |
| 5,507,957 | 4/1996 | Garrett et al. | 95/138 X |

FOREIGN PATENT DOCUMENTS

| | | | |
|---|---|---|---|
| 2510904 | 2/1983 | France . | |
| 1937574 | 7/1969 | Germany . | |
| 4314734 | 11/1994 | Germany . | |
| 4314942 | 11/1994 | Germany | 95/138 |
| 4317199 | 11/1994 | Germany | 423/219 |
| 51-008174 | 1/1976 | Japan | 95/141 |
| 54-132468 | 10/1979 | Japan | 95/138 |
| 55-005734 | 1/1980 | Japan | 95/138 |
| 55-047202 | 4/1980 | Japan | 95/138 |
| 55-152530 | 11/1980 | Japan | 95/138 |
| 56-076223 | 6/1981 | Japan | 95/141 |
| 56-168824 | 12/1981 | Japan | 95/138 |
| 3-229619 | 10/1991 | Japan | 423/219 |
| 3-293018 | 12/1991 | Japan | 423/219 |
| 4-027752 | 1/1992 | Japan | 95/143 |
| 4-131126 | 5/1992 | Japan | 423/219 |
| 1532227 | 11/1978 | United Kingdom . | |

Primary Examiner—Robert Spitzer
Attorney, Agent, or Firm—Connolly & Hutz

[57] ABSTRACT

A process in which a gas containing ozone and an organic substance is brought into contact with an ozone-binding polymer to remove the ozone and activated carbon to remove the organic substance. The process preferably makes use of a filter containing an ozone-binding polymer and activated carbon.

16 Claims, 1 Drawing Sheet

5,837,036

PROCESS AND FILTER FOR REMOVING ORGANIC SUBSTANCES AND OZONE FROM GASES

FIELD OF THE INVENTION

The invention relates to a process and the associated filter system in which a gas stream loaded with organic substances and ozone is first contacted with an ozone-binding polymer and then with activated carbon.

DESCRIPTION OF THE PRIOR ART

Activated carbon is used as an adsorbent for removing undesirable organic substances such as gasoline or solvent vapors from gases (Römpp Chemie Lexikon, [Römpp's Chemistry Lexicon], J. Falbe and M. Regitz (Editors), 9th Edition, Volume 1, Georg Thieme Verlag, Stuttgart—New York 1989, p. 83). Activated carbon can degrade ozone and is used as a filter material for removing ozone from gases.

If activated carbon is used for purifying gases which contain ozone and organic substances such as hydrocarbons, in the event of advanced loading of the activated carbon with organic substances, the undesirable effects listed below occur (see "Comparison of adsorption characteristics for VOC on activated carbon and oxidized activated carbon", J. H. You, H. L. Chiang, P. C. Chiang, Environ. Progr. 13 (1994) 31–36):

ozone no longer reacts directly with the activated carbon, but with the organic substances already adsorbed and partially chemically degrades these, in particular if these are unsaturated compounds.

The decomposition products formed in the ozone oxidation of adsorbed organic substances desorb from the activated carbon so that the purification action of the activated carbon is impaired in the presence of ozone. Some of the desorbed decomposition products (e.g. formaldehyde) are more toxic than the originally adsorbed organic substances.

If ozone is present in the gas to be purified, there is the risk of igniting the activated carbon, in particular if the exhaust airstreams to be purified have relatively high concentrations of ozone or organic substances.

Other conventional ozone-degrading materials lead to difficulties in the purification of gases which contain ozone and organic substances:

The usual ozone-degrading materials such as mixed oxides or compounds containing noble metals very rapidly lose their ozone-degrading activity in the presence of hydrocarbons.

Inorganic materials can form dusts.

Many ozone-degrading materials (e.g. mixed oxides) are sensitive to high atmospheric humidity.

Many ozone-degrading materials (e.g. noble metals) are sensitive to trace gases ($H_2S$, $SO_2$, formaldehyde) which act as catalyst poisons.

The object of the invention was therefore to develop a suitable filter for removing organic substances and ozone from gases which does not have the disadvantages of known filter systems and nevertheless utilizes the favorable properties of activated carbon for removing organic substances.

SUMMARY OF THE INVENTION

It has been found that certain polymers such as poly(phenylene sulfide) or poly(2,6-dimethylphenylene oxide) react with ozone without their filter action being impaired by organic substances such as hydrocarbons or other volatile organic compounds. It is therefore possible to decouple the purification of gases which contain ozone and organic substances by first contacting the gas with the ozone-binding polymer and then with activated carbon.

The invention therefore relates to a process for removing ozone and organic substances from gases, the gas first being contacted with an ozone-binding polymer and then with activated carbon.

DETAILED DESCRIPTION

Figure 1:
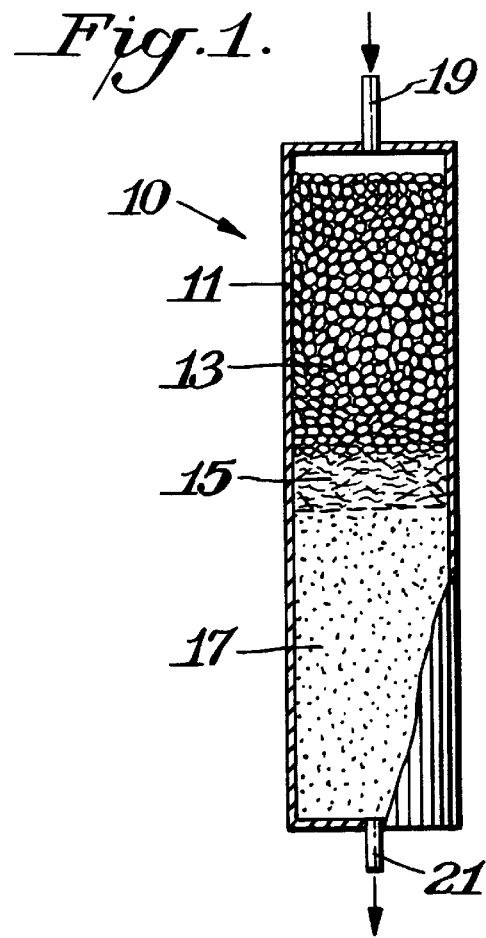
FIG. 1 is a side cross-sectional view illustrating a preferred filter structure having a single filter element comprising an ozone-binding polymer zone and an activated carbon zone.

The ozone-binding polymer preferably comprises poly(arylene ethers) and sulfur-containing polymers.

Poly(arylene ethers) designate polymers which contain methyl-substituted arylene ether units. Poly(2,6-dimethylphenylene oxide) or poly(2,6-dimethylphenylene ether) is preferably used as poly(arylene ether) (for properties and preparation see Ullmann's Encyclopedia of is Industrial Chemistry, Vol. A21, 5th Edition, B. Elvers, S. Hawkins and G. Schulz (Editors), VCH Publishers, Weinheim-New York 1992, p. 605 ff.).

The expression sulfur-containing polymers comprises all polymers which contain at least one arylene thioether unit (—Ar—S—; Ar: arylene). The arylene groups can be composed of mononuclear or polynuclear aromatics. The arylene groups are composed of at least one 5- or 6-membered ring which can contain one or more heteroatoms and can be unsubstituted or substituted. Heteroatoms are, e.g. nitrogen or oxygen, substituents are, e.g. linear or branched alkyl groups. The sulfur-containing polymers, apart from sulfur bridges (—S—) can also contain sulfoxide groups (—SO—) or sulfone groups (—$SO_2$—).

Sulfur-containing polymers are for example linear or branched poly(arylene sulfide) systems (mean molecular weight, MW: 4,000–200,000) having the repeating unit of the formula I which contain at least one thioether group,

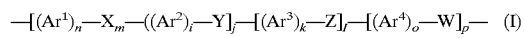
$$-[(Ar^1)_n-X_m-((Ar^2)_i-Y]_j-[(Ar^3)_k-Z]_l-[(Ar^4)_o-W]_p- \quad (I)$$

where $Ar^1$, $Ar^2$, $Ar^3$, $Ar^4$, W, X, Y and Z, independently of each other, are identical or different. The indices n, m, i, j, k, l, o and p are integers from 0 to 4, where their total must be at least 2. $Ar^1$, $Ar^2$, $Ar^3$ and $Ar^4$ in the formula (I) are single aryl systems or directly para-, meta- or ortho-linked aryl systems having 6 to 18 carbon atoms. W, X, Y and Z are linking groups selected from the group consisting of —$SO_2$—, —S—, —SO—, —O—, —CO—, —$CO_2$—, alkyl or alkylidene groups having 1–6 carbon atoms and —$NR^1$— groups, where $R^1$ is alkyl or alkylidene groups having 1–6 carbon atoms. The aryl systems of the formula (I) can optionally additionally, independently of each other, contain one or more functional groups such as alkyl radicals, halogens, sulfonic acid, amino, nitro, cyano, hydroxyl or carboxyl groups. In addition, block copolymers composed of units of the formula (I) can also be used.

Poly(arylene thioethers), in particular poly(phenylene sulfide), can be prepared on the basis of the reaction of dihalogenated aromatics with sodium sulfide in accordance with EDMONDS and HILL (U.S. Pat, No. 3,354,129; U.S. Pat. No. 4,016,145; see also "Ullmann's Encyclopedia of Industrial Chemistry", Volume A21, B. Elvers, S. Hawkins and G. Schulz (Editors), VCH, Weinheim-New York 1992, p. 463). The synthesis of poly(arylene thioethers) containing sulfone groups is described in Chimia 28(9), (1974) 567.

Poly(phenylene sulfide) (PPS) is preferably used as the sulfur-containing polymer. The arylene groups in PPS can have 1,4- and or 1,3-links. PPS indicates both the linear and also the crosslinked polymer. In addition, PPS, per arylene group, can contain, independently of each other, 1 to 4 functional groups, e.g. alkyl radicals, halogens, sulfonic acid, hydroxyl, amino, nitro, cyano or carboxyl groups.

If poly(arylene thioethers) according to the invention are used, generally poly(arylene thioethers) are suitable which have a mean molecular weight of 4,000 to 200,000, preferably 10,000 to 150,000, in particular 25,000 to 100,000.

The ozone-binding polymers can be used as powder, granules, fiber, nonwoven web, felt, fabric, film, sintered material, foam, mouldings or as a coating or impregnation of support materials. In particular, mouldings having a particularly large surface area are suitable, e.g. having a mesh or honeycomb structure. The powders have, e.g. commercially usable particle sizes, granules also being usable. It is important in this context that the gas or the liquid to be treated can be passed without trouble through the polymer material, for example in the form of a powder fixed bed. If the polymers are used as fibers, these can be used as staple fibers, needled felt, nonwoven material, card sliver or fabric. Films or film shreds can also be used in suitable form.

Coatings of support materials with ozone-binding polymer such as poly(phenylene sulfide) or poly(2,6-dimethylphenylene oxide) can be obtained by applying solutions of the sulfur-containing polymer to the support material. Impregnations are prepared, e.g. by soaking an absorbent support material. The support materials used are generally inorganic substances such as glass, silica gel, alumina, sand, ceramic masses, metal and organic substances such as plastics.

Metals for example, in particular noble metals and transition metals, or metal oxides such as transition metal oxides can also be applied to the ozone-binding polymers, for example by impregnation, which metals or metal oxides are then present in the form of small clusters.

The ozone-binding polymer can generally be used as unblended material. However, the addition of conventional fillers is also possible, such as chalk, talc, clay, mica, and/or fibrous reinforcing agents, such as glass fibers and/or carbon fibers, whiskers and other conventional additives and processing aids, e.g. lubricants, release agents, antioxidants and UV stabilizers.

The invention further relates to a filter which contains at least one ozone-binding polymer and activated carbon. The filter is constructed in such a way that the gas stream to be purified is first contacted with the ozone-binding polymer and then with the activated carbon.

The filter can comprise a single element which contains the ozone-binding polymer and the activated carbon. Such a filter is termed a combination filter. The filter can also comprise individual filters (one filter which contains the ozone-binding polymer and one filter which contains activated carbon) which are connected in series.

Surprisingly, the combination of ozone-binding polymer and activated carbon increases the service life of the activated carbon as an adsorbent.

When the filter according to the invention is used or the process according to the invention is carried out, generally, filter contact times of 0.1 to 60 seconds, preferably 0.2 to 5 sec and linear intake velocities of 0.02 to 1 meter per second, preferably 0.05–0.5 meter per second, are used.

By means of the novel filter or process, gases can be purified which contain organic substances in high concentration (e.g. 1,000 ppm). Generally, the filter or the process operates at concentrations of organic substances in the gases to be purified in the range from 0.05 to 100 ppm. The organic substances can be, for example, saturated or unsaturated hydrocarbons and aromatic compounds, in particular compounds which are contained in gasoline vapors, such as benzene, toluene, tert-butyl methyl ether and linear or branched $C_4$ to $C_{12}$ alkanes.

The gases to be purified can be all types of gases or exhaust gases which are formed in industrial or geophysical processes. The process is particularly suitable for purifying polluted air, as is formed in the combustion of fossil raw materials in combination with intensive solar irradiation ("Photochemical smog").

The novel filter and process feature the following advantages:

the polymeric filter material binds ozone quantitatively and is not influenced by hydrocarbons, trace gases and atmospheric humidity. Therefore, only ozone-free air is passed over the downstream activated carbon so that no harmful decomposition products can be generated any longer by ozone on the loaded activated carbon and no degradation of the activated carbon due to ozone proceeds.

Decoupling ozone filtration and adsorption of organic substances avoids oxidation of the adsorbed organic substances.

The ozone-binding filter material can be used in the most varied form, e.g. as fibrous material (nonwoven web, fabric, staple fiber etc.) or granules of varying particle size.

The sulfur-containing polymers, in particular poly (arylene thioethers), are flame-retardant and solvent-resistant, have melting points above 250° C., are non-toxic and adsorb virtually no hydrocarbons. In the case of the combination filter claimed, therefore, in comparison with the conventional activated carbon filters, virtually no restrictions are to be expected.

By means of the said combination of ozone-binding polymer and activated carbon, a significant increase in service life of the activated carbon is successfully achieved.

Turning now to the Drawing, a preferred filter apparatus 10 illustrated in FIG. 1 comprises a glass tube serving as a housing 11 for a filter element comprising a granulated poly(phenylene sulfide) (PPS) zone, i.e. the ozone-binding polymer zone 13 and an activated carbon zone 17, the two zones 13 and 17 being separated from each other by a glass-fiber wool layer 15 to prevent mixing of the filter materials. The glass tube housing 11 defines an inlet 19 for the gas containing ozone, hydrocarbons, and atmospheric moisture, and an outlet 21 for releasing purified gas.

Figure 2:
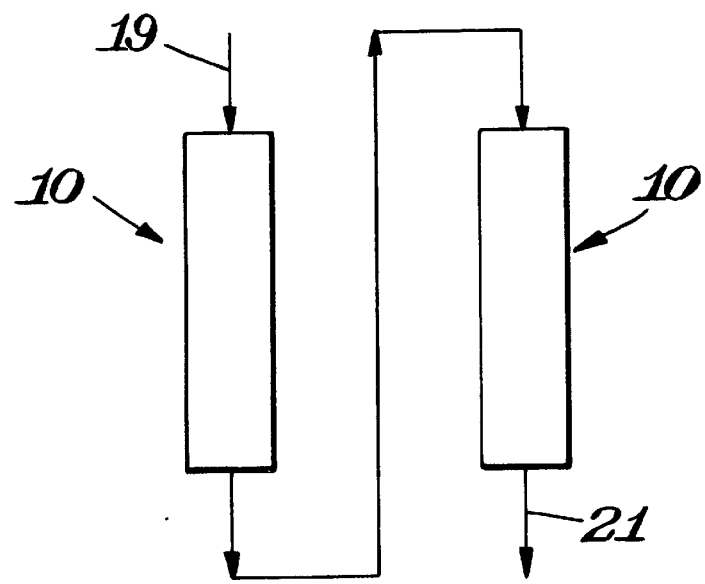
FIG. 2 is a schematic representation of a two-element filter system.

In an alternative embodiment shown in FIG. 2, the complete filter apparatus 10 comprises two filter elements, the first, upstream (PPS) element being in communication with the inlet 19 and the second, downstream (activated carbon) filter element discharging purified gas through outlet 21.

EXAMPLES

General Experimental Design

In a laboratory apparatus, ambient air was sucked in via a fan, enriched with hydrocarbons, ozone and atmospheric moisture and then passed over the filter.

The ozone generator used was a commercial ozone test gas generator from Horiba (Industriestraβe 8, 61449

Steinbach). The analytical instruments for measuring the ozone concentrations (type APOA 350E) and the hydrocarbon concentrations (type APHA 350E) originated from the same manufacturer.

The filters used in the experiments comprised a glass tube having an internal diameter of 2.5 cm and a length of 10 cm which were filled with poly(phenylene sulfide) and activated carbon, with activated carbon or with poly(phenylene sulfide). In the case of filters containing different filter materials, to avoid mixing, a little glass-fiber wool was added between the filter materials.

The volumetric flow rates were monitored via flow meters.

| Example 1: Comparison of combination filter/ activated carbon filter | |
|---|---|
| Activated carbon: | granular activated carbon (Dräger, Lübeck) |
| Ozone-binding polymer: | poly(1,4-phenylene sulfide) (PPS), particle size 0.5–1 mm |
| Filter, Example 1.1: | 2 g of PPS + 6 g of activated carbon |
| Filter, Example 1.2 (comparison experiment): | 6 g of activated carbon |
| Volumetric flow rate: | 180 liters per hour per filter |
| Temperature: | 25° C. |
| Ozone input concentration: | 350 micrograms per cubic meter (175 ppb) |
| Input concentration of organic substances: | 40 ppm (mixture of 50% toluene and 50% petroleum ether) |
| Relative atmospheric humidity: | 40–50% |

TABLE 1

Experimental results

| Experimental duration [h] | Ozone (downstream of filter) [ppm] Example 1.1/ Example 1.2 | Organic substances (downstream of filter) [ppm] Example 1.1/ Example 1.2 |
|---|---|---|
| 1 | 0.001/0.001 | 0/0 |
| 22 | 0.002/0.002 | 0/0.3 |
| 45 | 0.002/0.002 | 0.6/0.9 |
| 70 | 0.002/0.002 | 1.1/4.7 |
| 85 | 0.001/0.002 | 4.8/11.2 |
| 110 | 0.002/0.002 | 9.1/14.8 |

The breakthrough of organic substances, in the case of the combination filter (Example 1.1), occurs about 10 hours later than in the case of the simple activated carbon filter (Example 1.2). The combination filter of Example 1.1 shows a higher adsorption capacity for organic substances than an activated carbon filter (Example 1.2).

| Example 2: Comparison experiment activated carbon/PPS combination filter in a different arrangement | |
|---|---|
| Activated carbon: | granular activated carbon (Riedel de Haen) |
| Ozone-binding polymer: | poly(1,4-phenylene sulfide) (PPS), particle size 0.5–1 mm |
| Filter, Example 2.1: | 2 g of PPS/6 g of activated carbon |
| Filter, Example 2.2 (comparison experiment): | 6 g of activated carbon/ 2 g of PPS |
| Volumetric flow rate: | 180 l/h per filter |
| Temperature: | 25° C. |
| Ozone input concentration: | 260 micrograms per cubic meter (130 ppb) |
| Input concentration of organic substances: | 50 ppm (mixture of 50% toluene and 50% petroleum ether) |
| Relative atmospheric humidity: | 40–50% |

TABLE 2

Experimental results

| Experimental duration [h] | Ozone (downstream of filter) [ppm] Example 2.1/ Example 2.2 | Organic substances (downstream of filter) [ppm] Example 2.1/ Example 2.2 |
|---|---|---|
| 1 | 0.0/0.0 | 0/0 |
| 22 | 0.0/0.0 | 0/0 |
| 50 | 0.0/0.0 | 0/0 |
| 77 | 0.0/0.0 | 3.4/3.9 |
| 99 | 0.0/0.0 | 12.7/14.6 |
| 194 | 0.0/0.0 | 41.6/44.3 |

In this experiment, the properties of filters are compared into which the gas to be purified is passed through PPS and activated carbon and the sequence of the filter materials is PPS/activated carbon (Example 2.1) and activated carbon/PPS (Example 2.2).

The results show that the breakthrough of organic substances through an activated carbon filter is decreased when an ozone-binding polymer is applied before the activated carbon filter (Example 2.1). In the reverse case (ozone-binding polymer downstream of the activated carbon, Example 2.2) the service lives up to the breakthrough of organic substances are shorter.

| Example 3: Adsorption of organic substances by poly(1,4-phenylene sulfide) | |
|---|---|
| Activated carbon: | granular activated carbon (Riedel de Haen) |
| Ozone-binding polymer: | poly(1,4-phenylene sulfide (PPS), particle size 0.5–1 mm |
| Filter, Example 3.1: | 2 g of PPS |
| Filter, Example 3.2 (comparison experiment): | 6 g of PPS |
| Volumetric flow rate: | 180 l/h per filter |
| Temperature: | 25° C. |
| Ozone input concentration: | 260 micrograins per cubic meter (130 ppb) |
| Input concentration of organic substances: | 50 ppm (mixture of 50% toluene and 50% petroleum ether) |
| Relative atmospheric humidity: | 40–50% |

TABLE 3

| Experimental duration [min] | Ozone (downstream of filter) [ppm] Example 3.1/ Example 3.2 | Organic substances (downstream of filter) [ppm] Example 3.1/ Example 3.2 |
|---|---|---|
| 1 | 0.0/0.0 | 10/8 |
| 5 | 0.0/0.0 | 49.2/48.6 |
| 10 | 0.0/0.0 | 50/50 |

The results show that there is virtually no adsorption of organic substances to poly(phenylene sulfide). The adsorption capacity for organic substances is less than 0.01% based on the weight of the polymer. In the case of activated carbon, the value is approximately 5–10% of its own weight. Therefore, the improved adsorption action of the combination filter PPS/activated carbon for organics is not due to an additional adsorption effect by the polymer but due to the described different properties of activated carbons and PPS which supplement each other in an ideal manner.

We claim:

1. A process for removing ozone and an organic substance from a gas which contains ozone and at least one organic substance, which process comprises first contacting the gas with an ozone-binding polymer and then with activated carbon.

2. The process as claimed in claim 1, wherein the ozone-binding polymer contains arylene ether or arylene thioether units.

3. The process as claimed in claim 2, wherein the ozone-binding polymer is a poly(arylene ether) containing 2,6-dimethylphenylene oxide units or is a poly(arylene sulfide).

4. The process as claimed in claim 1, wherein the ozone-binding polymer is a filter material which is in the form of powdered, granular, fibrous, non-woven web, felt, fabric, film, film part, or molded material, or a combination thereof.

5. The process as claimed in claim 1, wherein the process is carried out at a temperature in the range from minus 10° C. to 150° C.

6. The process as claimed in claim 1, wherein a said organic substance to be removed from the gas is an aliphatic or aromatic compound.

7. The process as claimed in claim 1, wherein a said organic substance to be removed from the gas is a constituent of gasoline vapor.

8. The process as claimed in claim 1, wherein a said organic substance to be removed for the gas is a hydrocarbon.

9. The process as claimed in claim 1, wherein the organic substance to be removed from the gas is benzene, toluene, tert.-butyl methyl ether, a linear or branched $C_4$–$C_2$-alkane, or a mixture thereof.

10. A filter for removing ozone and organic substances from gases, wherein the filter contains at least one ozone-binding polymer and activated carbon.

11. The filter as claimed in claim 10, wherein the ozone-binding polymer contains arylene ether or arylene thioether units.

12. The filter as claimed in claim 10, wherein the ozone-binding polymer is a poly(arylene ether) containing 2,6-dimethylphenylene oxide units or is a poly(arylene sulfide).

13. The filter as claimed in claim 10, wherein the ozone-binding polymer is a filter material which is in the form of powdered, granular, fibrous, nonwoven web, felt, fabric, film, film part, or molded material, or a combination thereof.

14. A filter device for filtering a gas stream containing ozone and an organic substance, said device comprising, in combination, an ozone-binding polymer material for removing ozone from the gas stream, and, downstream from the ozone-binding polymer material, activated carbon for removing an organic substance from the gas stream.

15. The filter device as claimed in claim 14, comprising at least one filter element containing the ozone-binding polymer material alone or in combination with the activated carbon.

16. The filter device as claimed in claim 15, wherein the at least one filter element is divided into an upstream portion containing the ozone-binding polymer material, a downstream portion containing the activated carbon, and a fibrous material, interposed between the upstream and downstream portions, to prevent mixing of the ozone-binding polymer material with the activated carbon.

* * * * *